United States Patent [19]

McCurry et al.

[11] Patent Number: 4,666,749

[45] Date of Patent: May 19, 1987

[54] COVERING FOR ROLL END-SUPPORT PANEL

[76] Inventors: Thomas M. McCurry, 609 Jackson Square, Anderson, S.C. 29621; Lawrence E. Hoover, 1399 S. Belcher Rd., #257, Largo, Fla. 33541

[21] Appl. No.: 819,554

[22] Filed: Jan. 17, 1986

[51] Int. Cl.[4] ............................................. B32B 3/08
[52] U.S. Cl. ....................................... 428/34; 428/68; 428/76; 428/137; 206/408; 229/DIG. 12
[58] Field of Search ........................... 428/34, 137, 68; 206/408; 229/DIG. 12

[56] References Cited

U.S. PATENT DOCUMENTS

| Re. 25,624 | 7/1964 | Stahl . |
| Re. 27,212 | 11/1971 | Brown . |
| T857,001 | 12/1968 | Eells et al. . |
| T857,004 | 12/1968 | Murphy et al. . |
| T900,020 | 7/1972 | Britt et al. . |
| 1,856,694 | 5/1932 | Correvont . |
| 2,607,476 | 8/1952 | Rockefeller . |
| 2,690,593 | 10/1954 | Abercrombie . |
| 2,771,612 | 11/1956 | Samuels . |
| 2,878,628 | 3/1959 | Curry . |
| 2,957,792 | 10/1960 | Magid . |
| 2,992,457 | 7/1961 | Harrison . |
| 3,013,378 | 12/1961 | Newton . |
| 3,020,188 | 2/1962 | Zompa . |
| 3,022,543 | 2/1962 | Baird et al. . |
| 3,024,579 | 3/1962 | Stockhausen et al. . |
| 3,034,271 | 5/1962 | Carpenter et al. . |
| 3,047,370 | 7/1962 | Avtges et al. . |
| 3,060,655 | 10/1962 | Dreyfus . |
| 3,071,905 | 1/1963 | Morse . |
| 3,073,304 | 1/1963 | Schaar . |
| 3,116,033 | 12/1963 | Bock . |
| 3,203,543 | 8/1965 | Taylor, Jr. et al. . |
| 3,344,577 | 10/1967 | Harm . |
| 3,416,649 | 12/1968 | Snow . |
| 3,479,788 | 11/1969 | Dreyfus . |
| 3,489,274 | 1/1970 | Hughes et al. . |
| 3,526,315 | 9/1970 | Killian . |
| 3,590,549 | 7/1971 | Zelnick . |
| 3,607,496 | 9/1971 | Kissell . |
| 3,669,255 | 6/1972 | Raymus . |
| 3,679,048 | 7/1972 | Fujio . |
| 3,681,891 | 8/1972 | Stryck . |
| 3,685,644 | 8/1972 | Cothran et al. . |
| 3,694,995 | 10/1972 | McKinney . |
| 3,698,586 | 10/1972 | Terner . |
| 3,738,903 | 6/1973 | Berwick et al. . |
| 3,805,473 | 4/1974 | Lidgard . |

Primary Examiner—Alexander S. Thomas
Attorney, Agent, or Firm—Pollock, Vande Sande & Priddy

[57] ABSTRACT

An end-support panel for supporting rolls of web-like material wound on a cylindrical core and the process and apparatus for making the same is described. The panel includes a rigid panel member having an aperture extending laterally therethrough and a covering of heat-stretchable, heat-shrinkable plastic film extending entirely over one side of the panel member, around the edges of its periphery and aperture, and over a first zone and a second zone on the other side of the panel member, the first zone extending inwardly from the panel periphery, and the second zone extending outwardly from the panel aperture. The covering film is heated and then vacuum-stretched to conform to the shape of the panel periphery and the aperture perimeter. The film is then cooled and portions thereof are heat-shrunk to form a first band lying closely adjacent to the first zone and a second band lying closely adjacent to the second zone. The first and second bands define therebetween an intermediate zone of the other side of the panel member that is not covered by the primary covering film. An optional outer layer may be provided for covering the intermediate zone and this auxiliary covering may extend beneath and be secured to the first and second bands.

9 Claims, 12 Drawing Figures

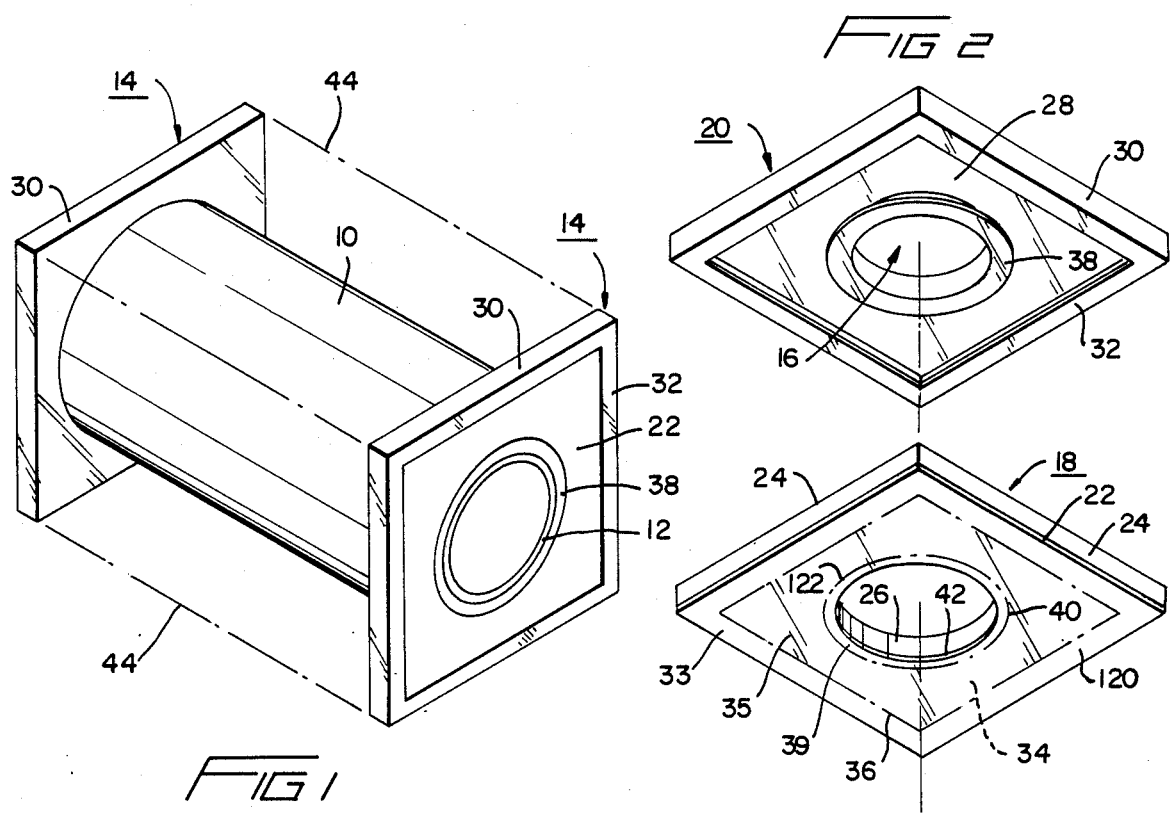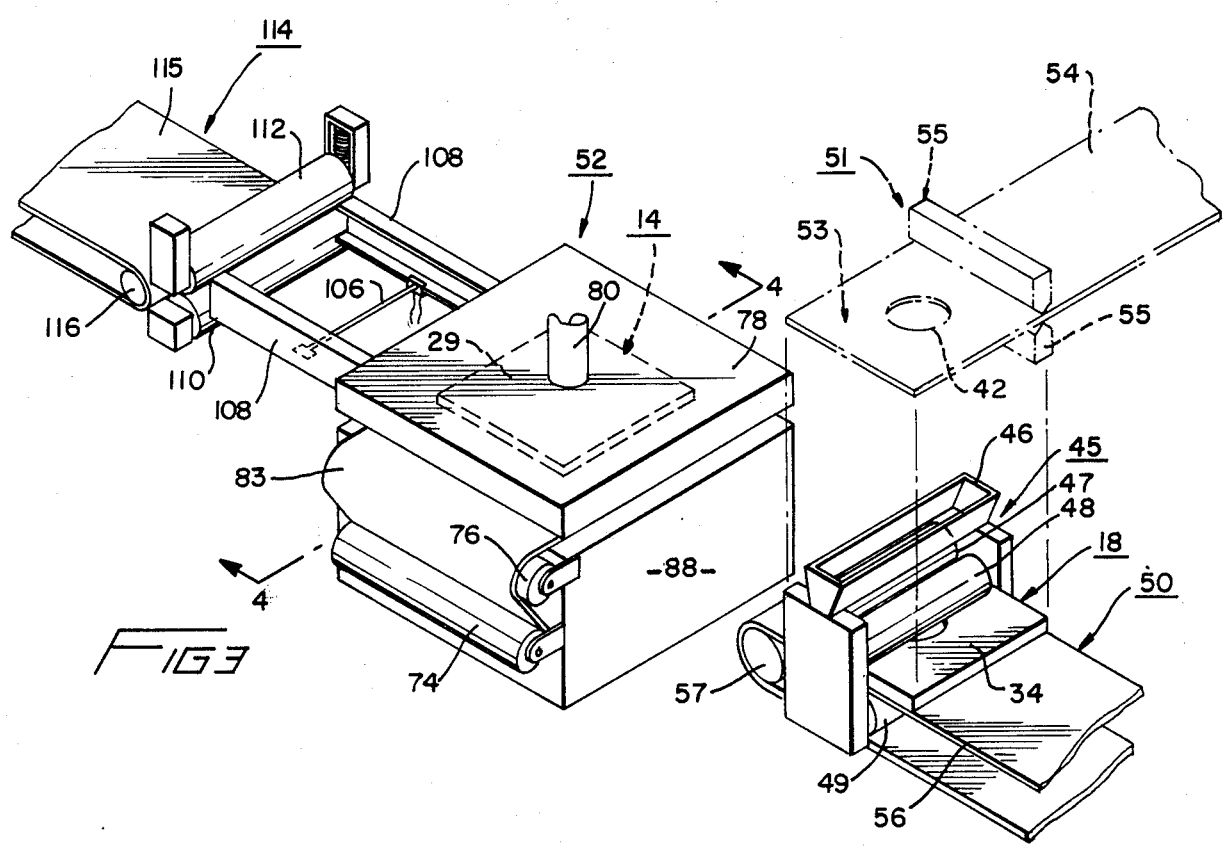

COVERING FOR ROLL END-SUPPORT PANEL

TECHNICAL FIELD

This invention relates to end-support panels for packaging rolls of web-like products such as continuous plastic film wound on a cylindrical core. More particularly, the invention relates to a covering for such end-support panels.

BACKGROUND OF THE INVENTION

Web-like products, such as continuous plastic film, may be shipped in the form of rolls of product material wound onto a cylindrical core. In order to avoid damage or contamination of exposed surfaces of such rolls, each end of the cylindrical core is supported by an end-support panel prior to packaging the wound roll for shipment. These end-support panels serve as flanges for supporting each end of the roll and are made of a relatively rigid material such as wood, fiberboard, or the like, in order to provide the strength required for supporting the roll which may be relatively heavy. The inward side of the panel may be padded with a cushioning type of material. Unfortunately, many of the materials from which the panels and/or the pads are made may abrade during shipment and cause contamination of the product material wound on the roll. The product material also may have a static charge, which can aggravate the contamination problem by attracting abraded and other loose debris.

It is known in the art to protect the roll of product material by encasing or enveloping the end-support panels in a hermetically sealed wrapper or the like, such as described in U.S. Pat. No. 3,685,644 issued Aug. 22, 1972, and U.S. Pat. No. 3,738,903, issued June 12, 1973. It is thus known to wrap the end-support panels entirely in a hermetically sealed envelope of plastic film. However this wrapping process is complicated and requires relatively expensive equipment. In addition, the hermetically sealed envelope provided initially is often destroyed when the cylindrical core is inserted within the aperture of the panel. Accordingly, the prior art does not provide a simple, commercially feasible product, method and apparatus wherein the inward or roll side of end-support panels is covered completely and efficiently so as to protect the roll of product material without unnecessary manufacturing expense.

DISCLOSURE OF THE INVENTION

The invention provides an end-support panel for supporting rolls of web-like material wound on a cylindrical core, and the process and apparatus for making the same.

Examples of web-like products that may be wound on the cylindrical core include continuous paper sheets such as photographic paper, and continuous plastic films such as X-ray film and base film for magnetic recording tapes, which may be made from polyethylene terephthalate. The end-support panel of the present invention includes a panel member of substantially rigid material such as wood, fiberboard or the like. The panel has an aperture extending laterally through a central portion thereof and a covering of heat-stretchable, heat-shrinkable plastic film. In developing the invention, it was found that the film covering is needed only along the edges and on the inward or roll side of the panel member so that covering the entire panel member as suggested by the prior art requires more cover film than actually is needed. Accordingly, the panel covering disclosed herein extends entirely over the inward side of the panel member and entirely around the edge at the periphery and the edge at the aperture of the panel member. However, only portions of the outward side of the panel member are covered with corresponding portions of the covering film, namely, a first zone running along and extending inwardly from the peripheral edge of the panel member and a second zone running along and extending outwardly from the edge of the panel member aperture.

A first portion of the covering film adjacent to the panel periphery is first heat-stretched around the peripheral edge and then heat-shrunk so as to form a first band covering the first zone, and a second portion of the covering film adjacent to the panel aperture is first heat-stretched around the edge of the aperture and then heat-shrunk so as to form a second band covering the second zone. The heat-shrinking of the first and second portions of the covering cause the first and second bands to pull tightly against and engage at least portions of the first and second zones, respectively, so as to firmly secure the covering in a fixed position on the panel member. In other words, the covering film is "necked-in" around the edges of the periphery and the edges of the aperture of the panel member so as to lock this covering in a fixed position on the panel member. The covering film also may be heat weldable, either directly to the material of the panel member or to an optional outer layer such as described below.

The outward side of the panel member between the first and second zones optionally may be covered by a layer of coating or sheet material. This optional outer layer may cover all or part of the outward side of the panel member. Preferably, at least a portion of this outer layer extends into both the first and second zones so as to be overlapped by at least a portion of the first and second bands, respectively, of the main plastic covering described above. The optional outer layer may be made of plastic such as synthetic resin, or of paper, cardboard or the like. The cost of the material for this outer layer is preferably less than that of the main covering. This outer layer also may be of a decorative material or may have writings or designs placed thereon. Thus, the outer layer if used may serve as a surface for receiving a label for marking the wound roll of product material.

In addition to the optional outer layer, areas of an adhesive material may be provided in order to increase the level of adhesion between the covering and the panel member. For example, the bands of covering film adjacent to the periphery and adjacent to the aperture of the panel member may be secured to the underlying zones of the outward side of the panel member or to corresponding zones of the optional outer layer by an adhesive composition, such as glue or a conventional synthetic adhesive which may be heat activated. Thus, the bands of the primary covering adjacent to the periphery and adjacent to the aperture of the panel member may be secured to underlying portions of a preformed outer sheet of plastic or paper material by corresponding bands of adhesive.

Similarly, where the optional outer layer is a preformed sheet of material, this outer sheet may be secured to the underlying outward side of the panel member by an adhesive. Another option is to coat or cover one or both sides of a pre-formed outer sheet with a layer of heat activated adhesive or heat weldable plastic.

The method and apparatus of the invention include positioning the panel member with one side thereof resting on a corresponding surface of a pedestal supported within a vacuum forming machine. The surface of the pedestal is substantially non-porous and has substantially the same shape as the panel member. The pedestal has an outer periphery of substantially smaller dimensions and a central aperture of substantially larger dimensions than those corresponding parts of the panel member. The pedestal preferably is made of a substantially rigid, non-porous material, such as metal, wood, hard plastic or the like. After the panel member is positioned on the pedestal, a section of heat-stretchable, heat-shrinkable plastic film is positioned over the entire other or free side and the outer peripheral edge of the panel member. This section of plastic film may be cut from a continuous supply sheet and is sized so that there is an excess of film extending well beyond the edge of the periphery of the panel member. After the film section is positioned over the panel member, it is heated so as to make stretchable at least the excess portion and the portion of the film section extending over the aperture of the panel member. The source of this heat is preferably a bank of radiant heating elements, such as resistance rods or coils, mounted on the underside of a cover or overhead panel of the vacuum forming machine. The heating apparatus preferably includes a highly polished reflector, such as a chrome reflector, mounted between the heating elements and the surface of the underside of the cover or panel. During the heating step, the film section may be either elevated above or placed in contact with the free side of the panel member. If heated in an elevated position, the film section is then lowered into contact with the free side of the panel member.

After the film section has reached its optimum plastic condition (as determined by a temperature probe connected to a thermostat within the forming chamber, or by a timer for the heating elements) and been placed in contact with the free side of the panel member, a pressure differential is provided across the film section by applying different pressures on the respective sides of the film section. This pressure differential causes the excess film to stretch around the edges of the periphery of the panel member and the film extending over the aperture to stretch through and around the edges of the aperture. The pressure differential preferably is provided by placing the non-porous pedestal member on a plate within the vacuum forming machine having apertures through which a vacuum is drawn. Due to the non-porous nature of the pedestal, the vacuum causes the film section to conform to the shape of the panel member everywhere except the area of abutment between the panel member and the underlying non-porous pedestal. The stretched portions of the film section pull the remaining portions of the film section so that plastic film is pulled tightly over the entire free side of the panel member, around the edge of the panel periphery and the edge of the panel aperture, and over the first and second zones of the other side of the panel member.

The first zone of the panel member is defined by the differences in the outer peripheral dimensions of the panel member and the pedestal, and the second zone is defined by the differences in the aperture dimensions of the panel member and the pedestal. Vacuum stretching of the heat-stretchable (plastic) portions of the film section cause a first portion to contact the pedestal side of the panel member from its peripheral edge to the pedestal member, and a second portion to contact the pedestal side of the panel member from its aperture edge to the pedestal member. Preferably, there is a sufficient excess of the peripheral portion of the film section to also extend downwardly past the sides of the pedestal member and onto an apertured vacuum plate. This amount of excess film ensures that the zones on the pedestal side of the panel member are completely covered with film with still enough film left over so that these zones will remain covered after heat shrinking the stretched portions of the film in order to form tight bands lying closely adjacent to these zones.

The heated and stretched film section is then cooled so as to set the shape of the film and lock the film covering in position on the panel member. This set shape conforms to the contour of the panel member as already indicated and helps secure the covering film in a fixed position on the panel member.

There then may remain remnants of the shaped film section that extend beyond the covered zones on the pedestal side of the panel member and these are trimmed away as being excess portions of the film section. The cooling step may occur either before or after these remnants of excess film are cut from the covered panel. The remnants preferably comprise those portions of the film section extending beyond the first and second zones on the pedestal side of the panel member. Preferably, a hot wire is positioned both around the periphery of the pedestal and around the perimeter of the aperture opening through the pedestal in a position to cleanly cut away these remnants. Alternately, a hot wire trimming means may be provided separately from the pedestal and positioned so that the remnants are removed as the covered panel travels along a track extending over a separate hot wire. In other words, the remnants of excess film tend to hang down from the covered panel member where they can be engaged by an underlying hot wire so as to cut them away from the remainder of the panel covering.

Following removal of the remnants by the trimming operation, the portions of the covering material on the outward side of the panel member preferably are heat-shrunk by direct contact with a hot roller or other panel conveying component made of heat conductive material. This causes the first and second covering bands to engage the first and second zones, respectively, on the outward side of the panel member. These bands secure the covering film in a fixed position on the panel member. The hot conveying component may be heated internally either by an electrical resistance element or by a gas or oil burner.

After the heat-shrinking operation, the pedestal side becomes the outward side of the covered end-support panel and accordingly the terms "pedestal side" and "outward side" are used interchangeably in this specification depending on whether reference is being made to the method of manufacture or the final product. The heat-shrunk portions of the film section may become sticky due to the heat so that the tight bands of covering material may actually adhere to at least a portion of the material lying within the peripheral zone and the aperture zone on the outward side of the panel member.

The apparatus also may include a coating station or a second supply of continuous sheet material and a cutting station for providing an auxiliary covering for the intermediate zone on the outward side of the panel member that is not covered by the primary covering previously described. This auxiliary covering is preferably a coated layer of a thermoplastic resin having substantially the same dimensions as the outward side of the panel member, including an aperture corresponding to the aperture of the panel member and a periphery corresponding to the periphery of the panel member. Thermoplastic polyolefinic resins of the ionomer type are preferred, whether applied as a coating or as a preformed sheet. One such resin is Surlyn which is available from the Polyolefins Division of E. I. du Pont de Nemours & Co. of Wilmington, Del., and may be applied to a substrate as a hot viscous melt.

The coating is applied to the panel member at a coating station which includes a supply of the coating composition and an applicator member for applying the coating to the outward side of the panel member. The coating layer thus provided preferably is heat-weldable and is placed so as to help secure the first and second bands of the primary covering to the corresponding zones on the outward side of the panel member.

If the outer layer is a pre-formed sheet, this sheet is placed on the pedestal member between its upper surface and the pedestal side of the panel member. This pre-formed sheet preferably extends into the first and second zones of the outward side of the panel member so that it will be held in position upon formation of the first and second bands of the covering. Where the separate outer sheet is provided instead of a coating, the first and second bands may be secured to corresponding portions of the outer sheet by an adhesive, this outer sheet being placed between the bands and the outward side of the panel member. Accordingly, the outer sheet may have bands of adhesive around the periphery and aperture thereof in areas that are to be engaged by the first and second bands, respectively, of the primary covering film. The separate outer sheet also may be secured directly to the outward side of the panel member by applying a layer of the adhesive to the abutment surface of this sheet before it is positioned between the pedestal and the overlying panel member. The separate outer sheet also could be laminated over the bands as an outermost layer.

The apparatus of the invention includes a vacuum forming machine having a base for supporting the pedestal member and a cover or frame cooperating with the base to provide a forming chamber for enclosing the pedestal member with the panel member supported thereon. When the cover or frame is open, supply and guide rollers supply a section of heat-stretchable, heat-shrinkable plastic film for placement over the upper free side of the panel member while it rests with its other side, whether covered or uncovered, in abutment with the non-porous surface of the pedestal member. The film section supplied is of a width and length providing an excess of film extending well beyond the periphery of the panel member as already described. The film section is preferably cut by a hot wire or mechanical cutter from a continuous sheet of thin plastic film provided from a supply roll mounted on or near the vacuum forming machine.

BRIEF DESCRIPTION OF THE DRAWINGS

FIG. 1 is a perspective view showing two of the end-support panels of the invention supporting a cylindrical core on which is wound a roll of plastic film.

FIG. 2 is an exploded perspective view showing the separate components of one end-support panel of the invention.

FIG. 3 is a perspective view illustrating the method and apparatus for making an end-support panel according to the invention.

DESCRIPTION OF BEST MODE AND OTHER EMBODIMENTS

Figure 4:
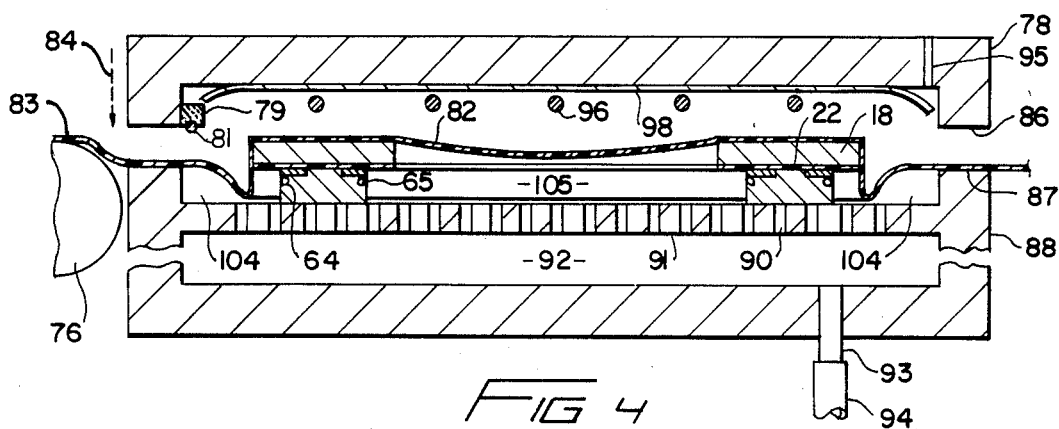
FIG. 4 is a fragmentary elevational view in section taken along lines 4—4 of FIG. 3 showing a vacuum forming machine of the invention in its open position.

The invention will now be described in detail with specific reference to the part designations as shown in the figures of the drawings.

FIG. 1 illustrates the manner in which a roll 10 of web-like material having a cylindrical core 12 is supported by a pair of end-support panels 14—14 made according to the invention. The web-like material of roll 10 may comprise a thin-film of extruded plastic material such as polyethylene terephthalate which may be used as a base film for magnetic recording tape. The width of the web-like material of the roll is less than the length of the cylindrical core 12 so that each end of the core projects beyond the roll 10 and is received in an aperture 16 passing transversely through each end-support panel 14.

Referring to FIG. 2, end-support panel 14 comprises a rigid panel member 18, a primary covering 20, and an optional outer layer 22. Panel member 18 has an inward side 29, an outward side 34, a peripheral edge 24 around the periphery thereof and a central aperture having an edge 26 around the perimeter thereof. Covering 20 has an inner wall 28 for entirely covering inward side 29 of panel member 18, an edge wall 30 for entirely covering peripheral edge 24 of panel member 18, and an outer band 32 for overlapping a peripheral zone 33 extending along and inwardly from peripheral edge 24 on outward side 34 of panel member 18 as represented by broken line 36. Covering 20 also has an inner band 38 for overlapping an aperture zone 39 extending along and outwardly from edge 26 of the panel aperture as represented by broken line 40. Bands 32 and 38 and zones 33 and 39 corresponding thereto have a transverse width in the range of preferably ⅛ inch to 1 inch, more preferably ¼ inch to ½ inch. A typical panel member may have a square shape measuring about 14.5 inches along each side, a thickness of about ½ inch and an aperture measuring about 6 inches.

The panel member 18 may be of wood, fiberboard or similar rigid material of sufficient compressive strength to support the full weight of the respective ends of a full roll 10 of web-like material. The covering 20 is preferably made from a thin film of extruded plastic material such as polyethylene, polypropylene, polyvinyl chloride, or the like. The plastic film of covering 20 also may be of the same material as the film of the web-like material wound on roll 10, such as polyethylene terephthalate. The film thickness is preferably 3 to 4 mils. An important feature of the invention is that the thin-film material of covering 20 is a plastic that is both heat-stretchable and heat-shrinkable.

The purpose of optional outer layer 22 is to cover an intermediate zone 35 of outward side 34 between peripheral zone 33 and aperture zone 39 of panel member 18. Outer layer 22 has an aperture 42 corresponding in size and location to panel member aperture 26. Apertures 26 and 42 may be die-cut in member 18 and layer 22, respectively, after member 18 has been coated with layer 22. The periphery of outer layer 22 preferably extends well into peripheral zone 33 and the perimeter of aperture 42 preferably extends well into aperture zone 39 so as to provide outer and inner areas, respectively, over which outer layer 22 may be secured both to outer band 32 and inner band 38 of covering 20. Bands 32 and 38 of primary covering 20 are secured to auxiliary covering layer 22 preferably by heat welding, although solvent welding or an adhesive may be used instead.

Outer layer 22 may be provided as a decorative auxiliary cover for outward side 34 of panel member 18 or as extra protection against a source of contamination that might exist if intermediate zone 35 of panel member 18 is left uncovered. However, it has been found in practice that there is little likelihood of contamination from uncovered portions of outward side 34, particularly in view of the final packaging material which is used to cover both roll 10 and support panels 14—14 prior to shipment as illustrated in FIG. 1 by broken lines 44. Packaging material 44 also is preferably extruded plastic film and sealingly engages the edge wall 30 of covering 20, thereby preventing transfer to roll 10 of any contaminants that might be present on the outward side 34 of panel member 18. Accordingly, substantial savings in material can be achieved by leaving intermediate zone 35 of outward side 34 uncovered or by providing an auxiliary covering of cheaper material than used for covering 20. Also, the cost of the equipment providing the covering 20, with or without an outer layer 22, is believed to be substantially less than that required for fully covering both sides of a panel member within a hermetically sealed envelope as suggested in U.S. Pat. No. 3,738,903 issued on June 12, 1973.

An apparatus for making support panels 14—14 in accordance with the invention is illustrated in FIGS. 3-7. A supply conveyor 50 supplies a panel member 18 to a vacuum forming machine 52. The supply means for providing individual panel members 18 to conveyor 50 is not shown because this may be done by hand or by an automatic feeder of conventional design, such as used to feed rectangular blanks of rigid material to a conveying or working means.

If an optional outer layer 22 is used on the end-support panel, it may be applied to the panel member 18 as a coating at a coating station 45 having a supply trough 46 for feeding the coating material into the pinching juncture between a feed roller 47 and an applicator roller 48. Feed roller 47 is elevated slightly above applicator roller 48 so that only the latter contacts the surface of outward side 34 of panel member 18 and thereby coats the same with a thin layer 22. A press roller 49 positioned beneath a conveyor belt 56 forces the panel member into firm engagement with the surface of applicator roller 48.

As an alternative to coating outward side 34 of panel member 18, there may be applied thereto a separate sheet 53 cut from a continuous web 54 by a pair of cutters 55—55 at an optional cutting station 51 illustrated diagramatically with broken lines above coating station 45 in FIG. 3. The pair of cutters 55—55 may be replaced by a transversely movable hot wire if web 54 is of a meltable plastic material similar to the material of covering 20. The aperture 26 in panel member 18 and the aperture 42 in layer 22 may be cut either before or after layer 22 has been applied to the panel member. Cutting of these apertures after application of layer 22 avoids getting coating material on the inside of aperture 26 where layer 22 is a coating, and avoids the necessity of aligning apertures 26 and 42 where layer 22 is applied as a separate sheet.

Conveyor 50 includes the endless belt 56 and a turning roller 57 adjacent to the vacuum forming machine. Panel member 18 is transferred by hand or by a conventional transfer mechanism (not shown) from conveyor 50 to the interior of the vacuum forming machine while the latter is in its open position. This transfer step positions panel member 18, together with outer layer 22 (if used) on a pedestal 60 as shown best in FIGS. 4 and 5. Outer layer 22 may be placed either on the upper side of panel 18 while it is on conveyor belt 56 as shown in FIG. 3, or on the lower side of panel 18 before it is placed on the conveyor. If placed on the upper side, the panel is inverted during its transfer to machine 52 so that layer 22 abuts pedestal 60.

Figures 6, 9:
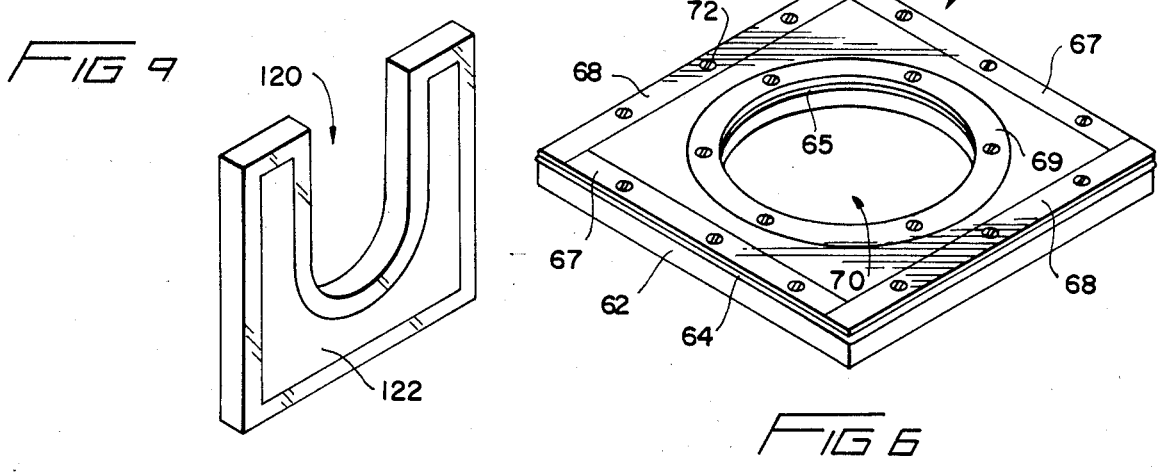
FIG. 6 is a perspective view of the pedestal component of the apparatus of the invention.
FIG. 9 is a perspective view of a modification of the end-support panel of the invention.

The structural details of pedestal 60 are shown best in FIG. 6 and include a base member 62, an outer hot wire 64, an inner hot wire 65, four outer securing and heat insulating strips 67—67 and 68—68, and an inner securing and heat insulating strip 69. Outer hot wire 64 fits within a corresponding groove around the periphery of base member 62 and inner hot wire 65 fits within a corresponding groove around the perimeter of a pedestal aperture 70. Outer hot wire 64 is held in position by two pairs of rectangular heat insulating and securing strips 67—67 and 68—68 extending along the upper edge of the outer periphery of base member 62. Hot wire 65 is held in position by an annular heat insulating and securing strip 69 extending around the upper edge of aperture 70. Strips 67—67, 68—68 and 69 are secured to base member 62 by conventional fastening elements, such as screws 72.

Figure 5:
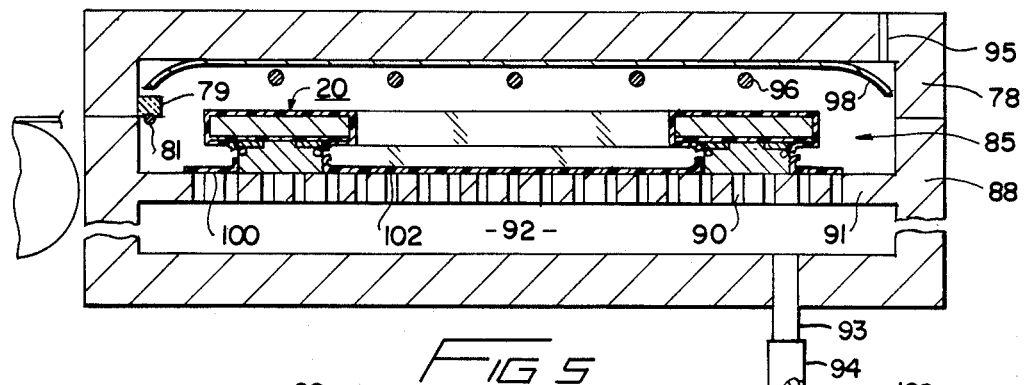
FIG. 5 is a fragmentary elevational view in section similar to FIG. 4 showing the vacuum forming machine in its closed position.

As seen in FIGS. 4 and 5, the overall dimensions of the pedestal periphery are substantially less than the overall dimensions of the panel periphery and the diameter of pedestal aperture 70 is substantially greater than the diameter of panel aperture 16 for reasons explained further below.

After panel member 18 is in position on pedestal 60, an end portion of a continuous web 83 of covering material is pulled from a supply roll 74, around a feed roller 76, and across the top of panel member 18 within the vacuum forming machine 52 while it is in an open condition as illustrated in FIG. 4. The cover 78 of the vacuum forming machine then is reciprocated from its open position as illustrated in FIGS. 3 and 4 to its closed position as illustrated in FIG. 5 by means of a driving rod or ram 80 connected to a reciprocating means such as a hydraulic cylinder mechanism (not shown).

Mounted on an inner side surface of cover 78 is a hot wire cutter 81 on an insulating mounting 82 for cutting off a section 82 of the covering material from the continuous web 83 as cover 78 reciprocates toward its closed position as illustrated by arrow 84 in FIG. 4. The mating surfaces 86 of cover 78 then engage corresponding mating surfaces 87 of the base 88 to provide a heating chamber 85 within vacuum forming machine 52. With cover 78 closed, the periphery of cover section 82 is held in engagement with lower mating surfaces 87 while a vacuum is pulled beneath severed cover section 82 by means of a plurality of holes 90 in a vacuum plate 91. Vacuum plate 91 defines the bottom wall of chamber 85 and the upper wall of a vacuum header 92 having an air outlet port 93 attached to a source of vacuum (not shown) through a vacuum hose 94. As represented by aperture 95 in cover 78, the portion of chamber 85 above the covering materials is open to atmospheric pressure in insure the pressure differential needed for shaping cover section 82 as described below.

Prior to applying a vacuum to header 92, there is activated a bank of radiant heating elements, such as resistance coils or rods 96, mounted on the underside of cover 78 in front of a reflector 98 of a highly reflective, heat resistant material such as chrome. The purpose of these heaters is to place film section 82 in a heat-stretchable condition so that the vacuum from header 92 will pull film section 82 into tight abutment and engagement with the inward side 29, the peripheral edge 24, the aperture edge 26 and the outward free zones 33 and 39 of panel member 18 and with the peripheral and aperture edges of pedestal 60 as shown in FIG. 5. After section 82 has been stretched into the shape of FIG. 5, hot wires 64 and 65 are activated so as to sever excess film from the edges of film section 82 as represented by the remnants 100 and 102.

Vacuum plate 91 causes the end portions of film section 82 to conform to the free zones 33 and 39 on the underside of panel member 18 and to the outer and inner edges of pedestal 60 by creating a corresponding vacuum in chambers 104 and 105 which exist temporarily beneath the loosely draped section 82 as shown diagrammatically in FIG. 4. Free zones 33 and 39 extend from the abutting area of pedestal 60 to the peripheral edge 24 and to the aperture edge 26, respectively, of panel member 18.

Prior to placement of panel 18 on pedestal 60, free zones 33 and 39 may be coated with an adhesive composition to provide increased adhesion with outer layer 22 or directly between panel 18 and bands 32 and 38 where layer 22 is omitted. Where a pre-formed sheet 53 is optionally used for layer 22, corresponding zones on the outward side of sheet 53 may be coated with an adhesive composition to provide increased adhesion between sheet 53 and bands 32 and 38. These bands or layers of adhesive material are not required to retain covering 20 in a fixed position on panel member 18 because this is accomplished by the shape of covering 20 alone or as supplemented by its adhesion directly to panel 18 or to panel layer 22. However, such bands of adhesive material may improve the retention of covering 20 and further isolate any contamination that may be present on the outward side 34 of the panel member.

Figure 7:
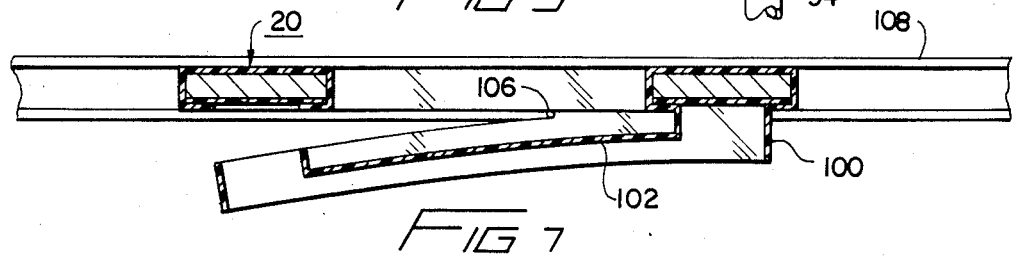
FIG. 7 illustrates an alternative step of the method of the invention.

After the vacuum in header 92 has served its purpose of stretching and shaping covering 20, the covering is cooled by extinguishing heaters 96 and raising the cover 78. The vacuum is then released so that the covered panel member 14 may be removed from heating chamber 85 for further processing. Referring again to FIG. 3, such further processing optionally may involve passage of the panel over another trimming hot wire 106 as the panel travels down a pair of guide rails 108—108 of a conveyor track downstream of the vacuum forming machine 52. The conveyor track may include a sprocket and endless chain drive mechanism (not shown) which engages opposite edges of the covered panel so as to convey it from machine 52 to a downstream heat shrinking station as described below. Auxiliary hot wire 106 will remove any additional remnants of plastic hanging down from the end-support panel after the vacuum covering operation. Hot wire 106 also may be used as an alternative method for removing the remnant skirts 100 and 102 as illustrated in FIG. 7, although the use of hot wires 64 and 65 in pedestal 60 is preferred.

Figure 8:
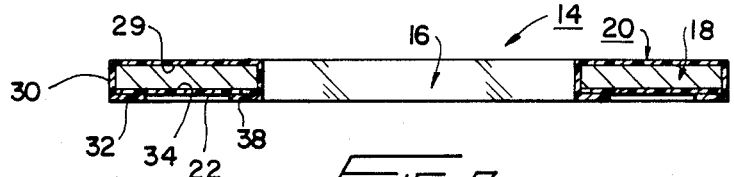
FIG. 8 is a cross-sectional edge view of the end-support panel of the invention.

After leaving the guide rails 108—108, the covered end-support panel 14 passes over a hot roller 110, preferably of heated metal, while traveling between this hot roller and a backing pressure roller 112 which may be of a heat resistant compressible material, such as synthetic rubber or the like. After passing between hot roller 110 and pressure roller 112, the covered panel 14 is fed to a discharge conveyor 114 having an endless belt 115 passing around a turning roller 116. The purpose of hot roller 110 is to cause any relatively loose edges remaining on the formed covering 20 to shrink into tight engagement with outward peripheral and aperture zones 33 and 39 so as to tightly retain the covering 20 in a fixed position on the panel member 18 as shown in FIG. 8. Although a significant amount of heat shrinkage may be provided by the hot wires 64 and 65 and/or hot wire 106, the use of a hot roller or other heated conveying member at a separate downstream heat shrinking station is preferred. The vacuum forming of the covering film around the peripheral and aperture edges of the panel member followed by heat shrinking of the bands 32 and 38 provide "necked-in" rims around the panel periphery and the panel aperture that mechanically secure the covering 20 in a fixed position on member 18.

Where the covering film is of a heat-weldable material, at least part of the film of bands 32 and 38 may become sticky due to the heat of roller 110 and this may cause bands 32 and 38 to adheringly engage at least some of the material against which it is pressed by the rollers 110 and 112, particularly where the underlying material of outer layer 22 or of panel member 18 (without layer 22) also is of a heat-weldable plastic material.

The invention is also applicable to support panels having other types of apertures such as the slot type aperture 120 shown in FIG. 9. Slot aperture 120 has the advantage of allowing the ends of cylindrical core 12 projecting beyond roll 10 to slide into the aperture from one edge of the end-support panel instead of having to be inserted axially into a closed aperture such as aperture 16. The aperture 16 or 120 also may be rectangular instead of rounded, especially where roll core 12 is of a corresponding cross-sectional shape. In other words, the term "aperture" as used in this specification includes open shapes such as slot aperture 120 and closed curve shapes other than circular. In the embodiment of FIG. 9, the outer face 122 of the panel member is not covered with an auxiliary outer covering, such as layer 22. The invention thus contemplates as alternatives to outer layer 22 that the area between the inner and outer bands of the primary covering may be either uncovered or covered with a separate outer sheet subsequently placed outside of covering bands 32 and 38.

Figure 10:
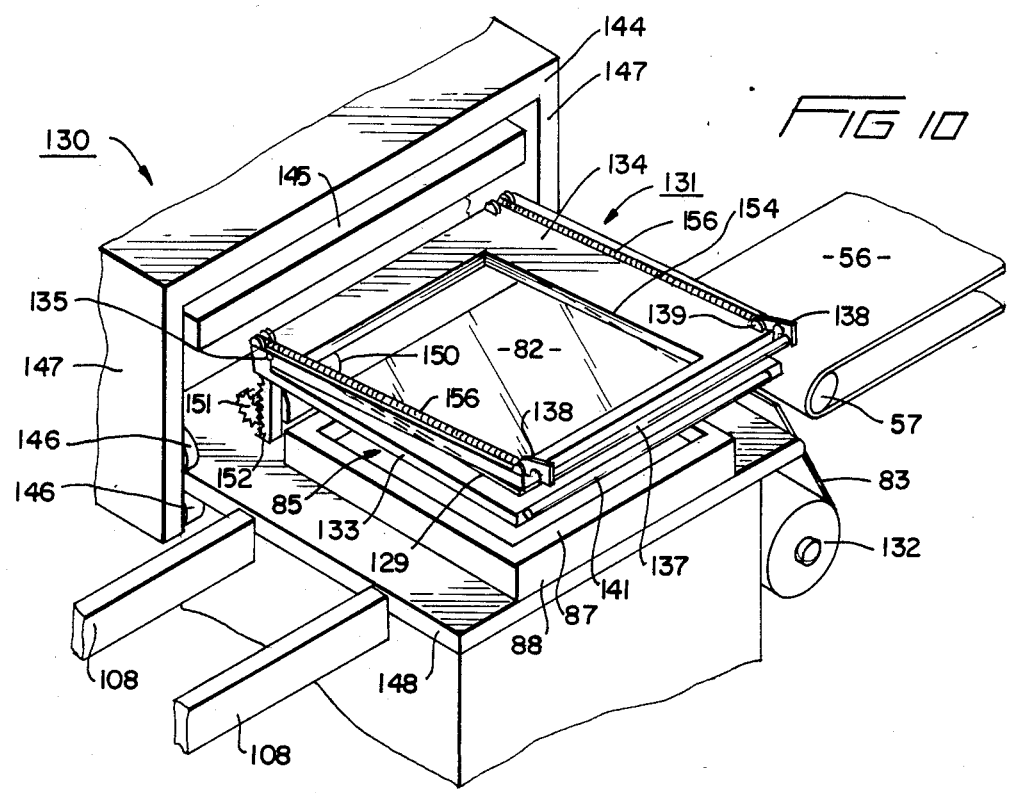
FIG. 10 is a perspective view of a modification of the vacuum forming machine of the invention shown in its open position.
Figure 11:
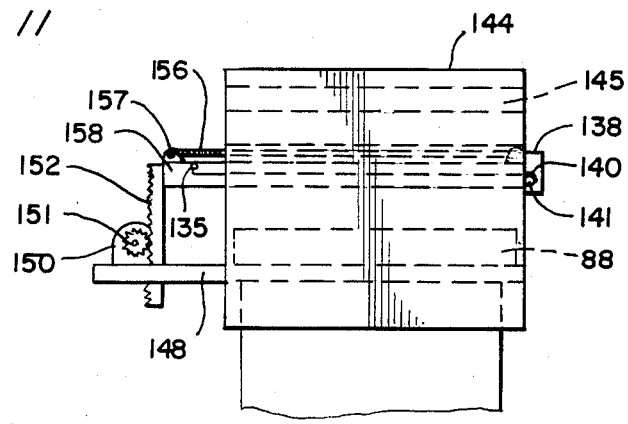
FIG. 11 is a side elevational view showing the modified vacuum forming machine of the invention in its heating position.
Figure 12:
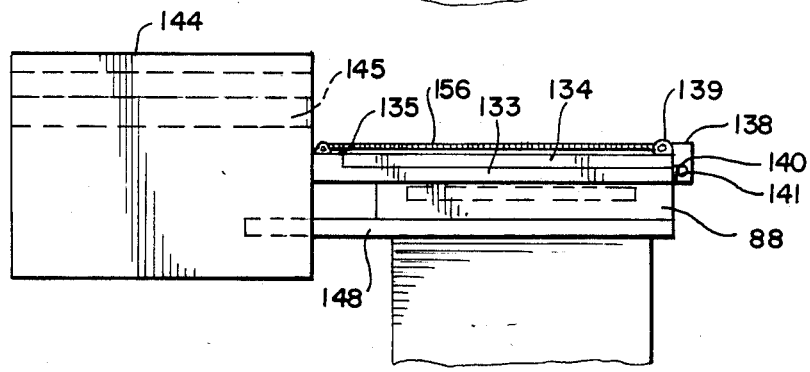
FIG. 12 is a side elevational view similar to FIG. 11 showing the modified vacuum forming machine of the invention in its closed position with the heating assembly retracted.

A preferred embodiment of the vacuum forming machine of the invention is shown in FIGS. 10-12. This embodiment employs the same arrangement of a pedestal 60 and a vacuum plate 91 within a base 88 as shown in FIGS. 4 and 5. However, the upper cover 78 of the embodiment of FIGS. 3-5 is replaced by a different structure for manipulating the covering material as described hereinafter.

Referring now to FIG. 10, there is shown a vacuum forming machine 130 having a film holding frame 131 and a film supply roll 132 providing a continuous web 83 of covering film. A covering section 82 of film web 83 is pulled from supply roll 132 into a position between a lower frame member 133 and an upper frame member 134 pivotally connected to lower frame member 133 by a hinge 135. After the leading edge 129 of covering section 82 is pulled between downstream mating surfaces of upper and lower frame members 134 and 133, these frame members are pushed together so as to clamp the covering section 82 therebetween and are locked in this clamping position by means of a handle 137 having a pair of latch pieces 138—138, one at each end thereof. Each latch piece 138 is pivotally mounted by a bracket 139 on the upper front edge of upper frame member 134, and has a semi-circular recess 140 for lockingly engaging a locking bar 141 mounted along the forward edge of lower frame member 133. The locking engagement between each locking piece 138 and locking bar 141 is shown best in FIGS. 11 and 12.

After covering section 82 is firmly clamped in position within frame 131, a slidable housing 144 carrying a heating assembly 145 is moved over frame 131 on pairs of rollers 146—146 mounted near the bottom of legs 147—147 of frame 144. One roller of each roller pair is mounted above and the other below the edge of a platform 148 on which is mounted the base 88 of the heating chamber 85. The forward (heating) position of housing 144 is shown in FIG. 11. While the housing is in this position, the heating assembly 145 is activated to heat the covering section 82 so that it is placed in the heat-stretchable condition previously described. The heating components of assembly 145 may be the same as those of heating cover 78 previously described.

When the film section 82 has attained a heat-stretchable condition, the frame 131 in its locked condition is lowered onto the base 88 until the periphery of covering section 82 rests in sealing engagement with the entire periphery of mating surface 87. Vertical reciprocation of frame 131 is preferably accomplished by an electric motor 150 having a pinion 151 which engages a vertically movable rack 152, the upper end of which carries the frame 131 in cantilevered fashion. Optionally, frame 131 could be reciprocated vertically by a hydraulic or pneumatic piston and cylinder mechanism.

Upper frame member 134 is provided with a large opening 154 which is of the same shape and has substantially the same dimensions as the internal periphery of base 88. The panel member when positioned on the pedestal passes into opening 154 so that its inward side 29 is engaged by the film when frame 131 is in its lowered position. This arrangement ensures that covering section 82 is brought into sealing engagement both with the inward side of panel member 18 and with mating surface 87 of base 88 so as to form temporary vacuum chambers 104 and 105 as previously described. Thereafter, a vacuum is pulled in chambers 104 and 105 so as to cause film section 82 to be drawn out of holding frame 131 and into tight abutment and engagement with the inward side 29, the peripheral edge 24, the aperture edge 26 and the outward free zones 33 and 39 of panel member 18 and with the peripheral and aperture edges of pedestal 60 as shown in FIG. 5. The lowered position of frame member 131 is illustrated in FIG. 12.

After film section 82 has attained the shape illustrated in FIG. 5, it is cooled by extinguishing the heaters in the heating assembly 145 and retracting the housing 144 as also illustrated in FIG. 12. The vacuum is then released and the frame 131 raised so that the covered end-support panel 14 may be removed from the base 88 for further processing as previously described. The raised frame 131 is then opened for receiving a new film section 82 by pivoting handle 137 upward so as to unlock latch pieces 138—138 from their engagement with locking bar 141. A pair of coil springs 156—156 is preferably attached to upper frame member 134 so as to bias this member into its open position relative to lower frame member 133 upon release of the locking mechanism. One end of each spring 156 is connected to a bracket 157 mounted at the back of frame 131 on a base piece 158, which may be integral with lower frame member 133 and is pivotally attached by hinge 135 to upper frame member 134. The other end of each spring 156 may be connected to the bracket 139 for pivotally mounting locking pieces 138 or to an additional bracket (not shown) located rearwardly of bracket 139.

What is claimed is:

1. A panel for supporting an end of a cylindrical core on which is wound a roll of web-like material such as continuous plastic film, said panel comprising:
   a panel member of substantially rigid material having an aperture extending laterally therethrough for receiving the end of said cylindrical core;
   a covering of heat-stretchable, heat-shrinkable plastic film extending entirely over one side of said panel member, around the edge of the periphery and the edge of the aperture of said panel member, and over a first zone and a second zone on the other side of said panel member; and,
   an auxiliary layer of material on the other side of said panel member;
   said first zone running along and extending inwardly from the edge of said panel periphery and said second zone running along and extending outwardly from the edge of said panel aperture,
   said covering having a first band lying closely adjacent to said first zone and a second band lying closely adjacent to said second zone so as to secure said covering in a fixed position on said panel member,
   said first zone and said second zone defining therebetween an intermediate zone on the other side of said panel member that is not covered by said covering film,
   and said auxiliary layer of material covering at least part of said intermediate zone on said other side of said panel member and extending over at least portions of said first zone and said second zone beneath said first band and said second band, respectively.

2. The panel of claim 1 in which said covering includes a heat-stretched first portion conforming of the shape of the edge of said panel periphery and a heat-stretched second portion conforming to the shape of the edge of said aperture.

3. The panel of claim 2 in which said first-band comprises a heat-shrunk first portion of said covering and said second band comprises a heat-shrunk second portion of said covering.

4. The panel of claim 1 in which said auxiliary layer comprises a coating and said panel member comprises a substrate for said coating.

5. The panel of claim 1 in which said auxiliary layer comprises a preformed sheet of plastic material.

6. The panel of claim 5 in which said preformed sheet is secured to said other side of said panel member by an area of adhesion.

7. The panel of claim 1 in which said auxiliary layer is secured to said first band and said second band by an area of adhesion.

8. The panel of claim 1 in which said first band and said second band are secured to said other side of said panel member by an area of adhesion.

9. The panel of claim 1 in which said auxiliary layer of material covers substantially all of said intermediate zone on said other side of said panel.

* * * * *